(12) United States Patent
Ohashi

(10) Patent No.: US 8,833,412 B2
(45) Date of Patent: Sep. 16, 2014

(54) PNEUMATIC TIRE

(75) Inventor: Toshiyuki Ohashi, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 423 days.

(21) Appl. No.: 13/164,261

(22) Filed: Jun. 20, 2011

(65) Prior Publication Data

US 2011/0315289 A1    Dec. 29, 2011

(30) Foreign Application Priority Data

Jun. 23, 2010 (JP) ................................. 2010-142790

(51) Int. Cl.
*B60C 11/12* (2006.01)
*B60C 11/11* (2006.01)

(52) U.S. Cl.
CPC ......... *B60C 11/12* (2013.01); *B60C 2011/1213* (2013.04); *B60C 11/11* (2013.01); *B60C 2011/1254* (2013.04); *B60C 11/1204* (2013.04); *B60C 11/1218* (2013.04); *Y10S 152/03* (2013.01)
USPC ............. 152/209.18; 152/209.21; 152/DIG. 3

(58) Field of Classification Search
CPC ............ B60C 11/1204; B60C 11/1218; B60C 11/1227; B60C 11/1281; B60C 2011/1209; B60C 2011/1213
USPC ............................ 152/209.18, 209.21, DIG. 3
See application file for complete search history.

(56) References Cited

U.S. PATENT DOCUMENTS

| | | | |
|---|---|---|---|
| 2,926,715 A * | 3/1960 | Constantakis | 152/209.27 |
| 4,566,514 A * | 1/1986 | Mauk et al. | 152/209.23 |
| 6,315,018 B1 | 11/2001 | Watanabe | |
| 2006/0016537 A1 | 1/2006 | Kuroda | |
| 2006/0037683 A1 | 2/2006 | Cuny et al. | |
| 2007/0272337 A1 | 11/2007 | Bovaird et al. | |
| 2009/0050248 A1 | 2/2009 | Ohashi | |

FOREIGN PATENT DOCUMENTS

| | | | |
|---|---|---|---|
| DE | 3118407 | * | 12/1982 |
| EP | 1769946 | * | 4/2007 |
| JP | 02-246810 | * | 10/1990 |
| JP | 04-372406 | * | 12/1992 |
| JP | 09-183303 | * | 7/1997 |
| JP | 10-029412 A | | 2/1998 |
| JP | 11-048721 A | | 2/1999 |
| JP | 11-151913 A | | 6/1999 |

(Continued)

OTHER PUBLICATIONS

English machine translation of DE3118407, dated Dec. 1982.*

(Continued)

*Primary Examiner* — Steven D Maki
*Assistant Examiner* — Robert Dye
(74) *Attorney, Agent, or Firm* — Westerman, Hattori, Daniels & Adrian, LLP

(57) ABSTRACT

A sipe extending in a tire width direction is provided in a land part (block) of a tread shoulder region. An inner region on the tire equator side in a length direction of the sipe is formed in a straight sipe portion over the whole of a sipe depth direction. A region on the tread ground contact end side relative to the inner region is divided and provided in the straight sipe portion on the sipe opening side and a waveform sipe portion on the sipe bottom part side in the sipe depth direction.

6 Claims, 6 Drawing Sheets

(56) References Cited

FOREIGN PATENT DOCUMENTS

| | | | |
|---|---|---|---|
| JP | 2004-161166 A | | 6/2004 |
| JP | 2005-035342 | * | 2/2005 |
| JP | 2005-247105 A | | 9/2005 |
| JP | 2006-036102 A | | 2/2006 |
| JP | 2006-056502 A | | 3/2006 |
| JP | 2007-314168 A | | 12/2007 |
| JP | 2009-051309 A | | 3/2009 |

OTHER PUBLICATIONS

English machine translation of JP2005-035342, dated Feb. 2005.*

* cited by examiner

FIG. 4
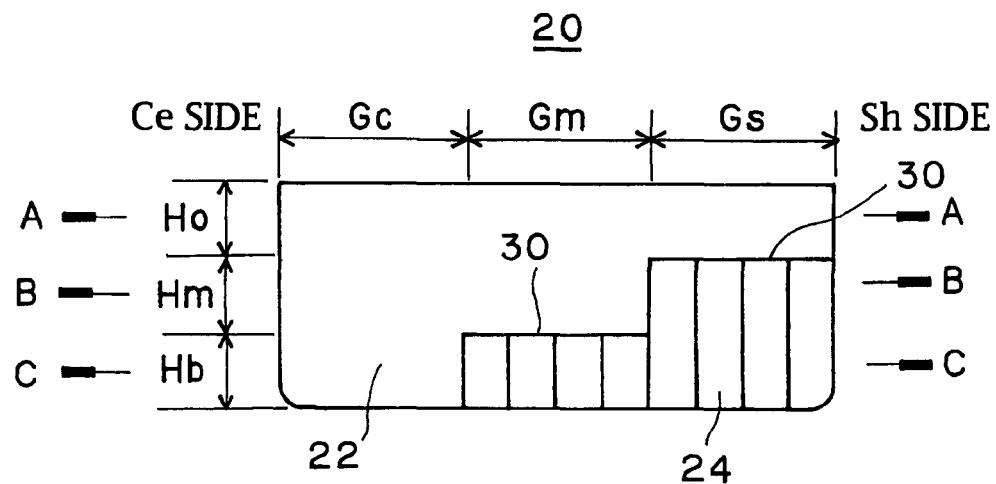
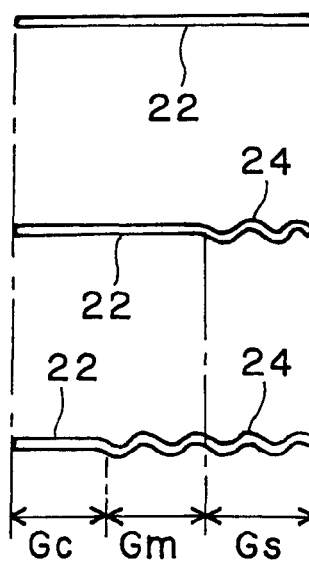
FIG. 5A
FIG. 5B
FIG. 5C

PNEUMATIC TIRE

CROSS-REFERENCE TO RELATED APPLICATIONS

This application is based upon and claims the benefit of priority from the prior Japanese Patent Application No. 2010-142790, filed on Jun. 23, 2010; the entire contents of which are incorporated herein by reference.

BACKGROUND OF THE INVENTION

1. Field of the Invention

The present invention relates to a pneumatic tire, and in particular, it relates to a pneumatic tire in which a sipe is formed in a land part of a tread surface.

2. Description of the Related Art

In a land part of a tread surface of a pneumatic tire, for the purpose of enhancing a noise performance, a wet performance or the like, there may be the case where a sipe extending in a tire width direction is provided. Conventionally, in those provided with such a sipe in the width direction, it is known that by forming a waveform sipe in a bottom part of a straight sipe, the sipe shape is changed from a straight line to a waveform form over the middle of wear to the end of wear, thereby raising an edge effect in the end of wear (see, for example, JP-A-2004-161166, JP-A-2006-56502 and JP-A-2007-314168).

In the foregoing conventional sipes, the waveform sipe provided in the bottom part of the straight sipe was formed over the whole of the sipe length direction. When the whole of the bottom part is formed in a waveform shape in such a way, on the occasion in which after vulcanization molding of a tire, a sipe molding blade of a die is removed from a tread part, die releasability is poor, so that a problem such as chipping of rubber is easily caused in the sipe surroundings. Such defectiveness of die releasability is not substantially problematic with respect to tires with low rubber hardness such as studless tires, whereas it is a serious problem with respect to tires with high rubber hardness such as all-season tires and summer tires.

Now, in pneumatic tires, there is taken ground contact pressure distribution in which at the time of normal running, especially at the time of braking, the ground contact pressure is locally raised in a shoulder region of a tread, in particular, on the ground contact end side within a shoulder region. When the ground contact pressure is locally raised in this way, it may be considered that in the subject portion, collapse of a sipe becomes large, and the movement (deformation) of a block becomes large, whereby a braking performance and a wear performance are adversely affected. However, according to the foregoing conventional sipe configurations, since the sipe has a fixed shape in the length direction, the collapse of a sipe to be caused due to a local rise of the ground contact pressure on the ground contact end side within such a shoulder region could not be suppressed.

SUMMARY OF THE INVENTION

In view of the foregoing circumstances, an object is to provide a pneumatic tire capable of suppressing the movement of a block on the ground contact end side within a shoulder region while improving the die releasability of a sipe molding blade.

According to an aspect of the invention, a pneumatic tire includes a sipe extending in a tire width direction provided in a land part located in a shoulder region of a tread part, both ends of which terminate within the land part, wherein the sipe is formed in such a manner that an inner region on the tire equator side in a sipe length direction is formed in a straight sipe portion over the whole of a sipe depth direction and that a region on the tread ground contact end side relative to the inner region is divided into a straight sipe portion on the sipe opening side and a waveform sipe portion on the sipe bottom part side in the sipe depth direction.

BRIEF DESCRIPTION OF THE DRAWINGS

FIG. 4 is a front view showing a wall face of a sipe according to First Embodiment.

FIGS. 5A to 5C are each a sectional view of a sipe according to Second Embodiment in each of wear stages.

DETAILED DESCRIPTION OF THE PREFERRED EMBODIMENTS

Embodiments of the invention are hereunder described by reference to the accompanying drawings.

First Embodiment

Though illustration is omitted, a pneumatic tire according to First Embodiment is configured to include a left-and-right pair of a bead part and a sidewall part and a tread part 10 provided between the both sidewall parts so as to connect radial-direction external end parts of the left-and-right sidewall parts to each other. The tire includes a carcass extending over the pair of bead parts. The carcass is composed of at least one carcass ply which extends from the tread part 10 to the sidewall parts and both end parts of which are engaged with an annular bead core embedded in the bead parts, and reinforces each of the foregoing parts. A belt composed of two or more rubber-coated steel code layers is provided on the peripheral side of the carcass in the tread part 10 and reinforces the tread part 10 in the periphery of the carcass.

Figure 1:
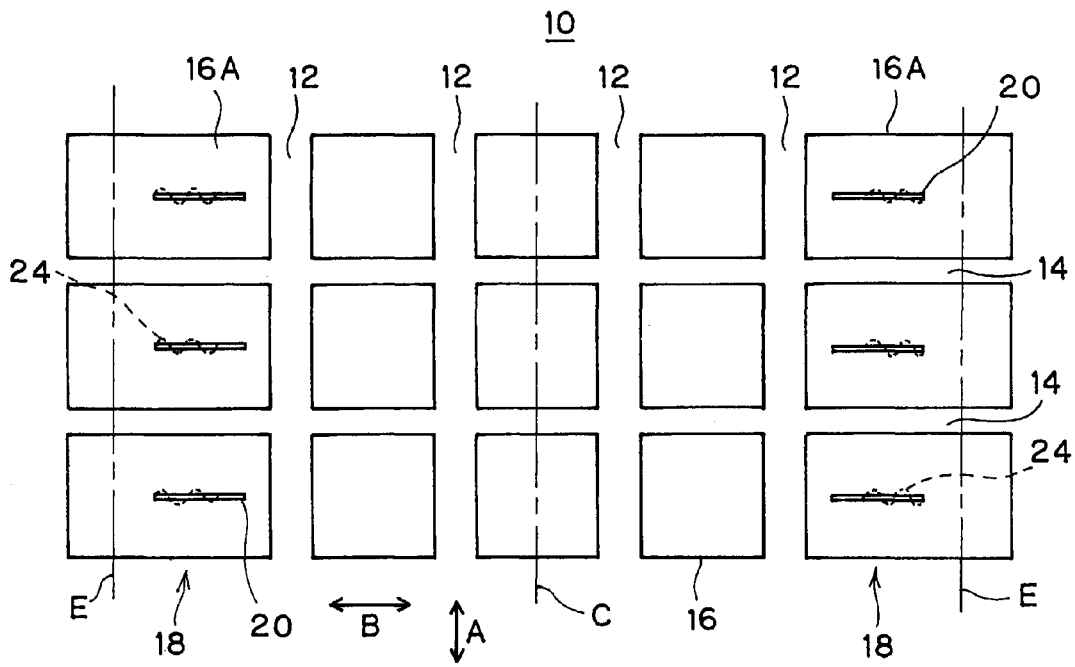
FIG. 1 is a development of a tread pattern of a tire according to First Embodiment.
Figure 2:
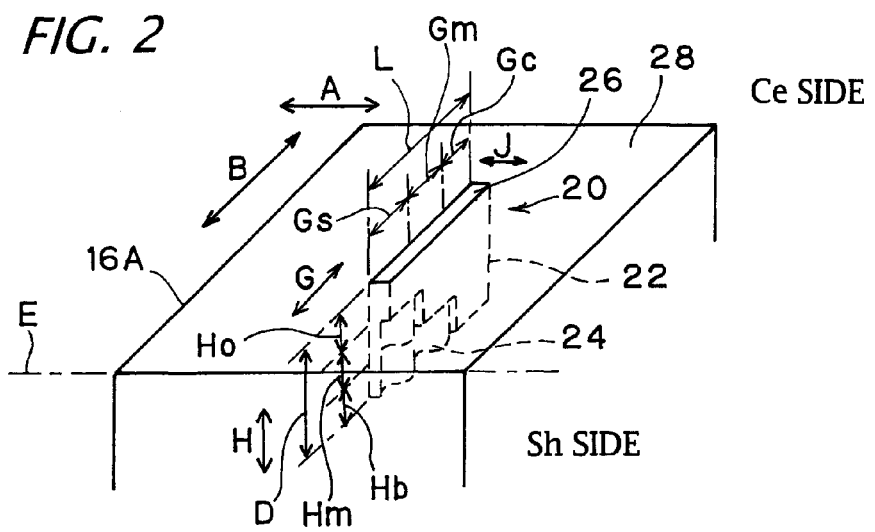
FIG. 2 is a perspective view of a block according to First Embodiment.

As shown in FIG. 1, the tread part 10 is provided with plural longitudinal grooves (main grooves) 12 extending in a straight line in a tire circumferential direction A and plural transverse grooves 14 intersecting with the longitudinal grooves 12 and also provided with plural blocks 16 which are divided by the longitudinal grooves 12 and the transverse grooves 14. According to this exemplary embodiment, four longitudinal grooves 12 are provided in a tire width direction B, whereby five block rows are arranged in the tire width direction B. Among them, regions in the both end parts in the tire width direction B are a shoulder region 18. Incidentally, in FIG. 1, a symbol C stands for a tire equator, and a symbol E stands for a tread ground contact end.

A block 16A (hereinafter also referred to as a "shoulder block") that is a land part provided in the shoulder region 18 is provided with a sipe 20 extending in the tire width direction B. The sipe 20 is a cut, the both ends of which are not opened against a block edge (namely, a cut terminating within the block without being opened against the longitudinal groove 12, and this cut is also called a "closed sipe"). The sipe 20 extends in a straight line along the tire width direction B, and every one sipe 20 is provided in each of the blocks 16A.

A configuration of the sipe 20 is described in detail on the basis of FIGS. 2, 3A to 3C and 4. In the sipe 20, an inner region Gc on a tire equator C side in its length direction G (the tire equator C side will be hereinafter referred to as "equator side Ce" and expressed as "Ce side" in the drawings) is formed in a straight sipe portion 22 over the whole of a sipe depth direction H. Also, a region (Gs+Gm) on the tread ground contact end E side relative to this inner region Gc (the tread ground contact end E side will be hereinafter referred to as "ground contact side Sh side" and expressed as "Sh side" in the drawings) is divided in the sipe depth direction H and formed in two portions of the straight sipe portion 22 on a sipe opening 26 side and a waveform sipe portion 24 on the sipe bottom part side.

The straight sipe portion 22 as referred to herein is a portion having a sipe shape extending in a straight line along the sipe length direction G and is a portion in which a sectional shape parallel to a tread surface 28 is formed in a straight line. Meanwhile, the waveform side portion 24 as referred to herein is a portion having a waveform sipe shape extending in the sipe length direction G while repeating curvature or bending and is a portion in which a sectional shape parallel to the tread surface 28 is formed in a waveform shape with amplitude in a sipe width direction J.

In detail, in the sipe 20, the foregoing region (Gs+Gm) which is divided into the straight side portion 22 and the waveform sipe portion 24 in its depth direction H is divided into plural regions Gs and Gm (two in this exemplary example) in the sipe length direction G. Then, the two regions Gs and Gm are set up in such a manner that a height of the waveform sipe portion 24 (namely, a dimension in the sipe depth direction H) becomes larger stepwise toward the region Gs on the ground contact end side Sh.

In more detail, in the sipe 20, its length direction G is divided into three regions by a plane vertical to the length direction G, in which a region on the equator side Ce is defined as the inner region Gc, a region on the ground contact end side Sh is defined as an outer region Gs, and a region between the inner region Gc and the outer region Gs is defined as a central region Gm. Also, the depth direction H is divided into three regions by a plane parallel to the tread surface 28, in which a region on the sipe opening 26 side is defined as an opening side region Ho, a region on the sipe bottom part side is defined as a bottom part region Hb, and a region between the opening side region Ho and the bottom part region Hb is defined as a central depth region Hm.

When the respective regions of the length direction G and the depth direction H are defined in this way, in the sipe 20, the inner region Gc is formed in the straight sipe portion 22 over the whole of the depth direction H. Also, with respect to the central region Gm, the opening side region Ho and the central depth region Hm are formed in the straight sipe portion 22, the bottom part region Hb located across a boundary 30 parallel to the tread surface 28 and in a lower portion thereof is formed in the waveform sipe portion 24. Furthermore, with respect to the outer region Gs, the opening side region Ho is formed in the straight sipe portion 22, and the central depth region Hm and the bottom part region Hb located across the boundary 30 parallel to the tread surface 28 and in a lower portion thereof are formed in the waveform sipe portion 24. According to this, as shown in FIG. 4, the waveform sipe portion 24 is formed in the region on the sipe bottom part side exclusive of the inner region Gc and is formed stepwise in such a manner that the height becomes higher toward the ground contact end side Sh.

Incidentally, in FIG. 4, the boundary 30 between the straight sipe portion 22 and the waveform sipe portion 24 is expressed by a simple line. However, in fact, a transition part in which the straight line is switched to the waveform is present within the range of several % of a sipe depth D (for example, from about 1 to 3%), and the boundary 30 is composed of such a transition part with a prescribed width.

Though the respective dimensions of the sipe 20 are not particularly limited, it is preferable that these dimensions are set up as follows. In the sipe length direction G, a width of each of the regions Gc, Gm and Gs is preferably from 20 to 40% relative to a full length L of the sipe 20 (namely, the inner region Gc=from 0.2 L to 0.4 L, the central region Gm=from 0.2 L to 0.4 L, and the outer region Gs=from 0.2 L to 0.4 L). It is more preferable that the full length L of the sipe 20 is divided into three equal parts.

Also, in the sipe depth direction H, a depth of each of the regions Ho, Hm and Hb is preferably from 20 to 40% relative to the depth D of the sipe 20 (namely, the opening side region Ho=from 0.2 D to 0.4 D, the central depth region Hm=from 0.2 D to 0.4 D, and the bottom part region Hb=from 0.2 D to 0.4 D). It is more preferable that the depth D of the sipe 20 is divided into three equal parts. Incidentally, the depth D of the sipe 20 is preferably from 50 to 90% of a depth of the longitudinal groove 12.

With respect to the groove width of the sipe 20, a usual sipe width can be employed. For example, the groove width of the sipe 20 can be set up preferably to from 0.2 to 1.6 mm, and it is more preferably from 0.3 to 1.2 mm.

Figure 3A:
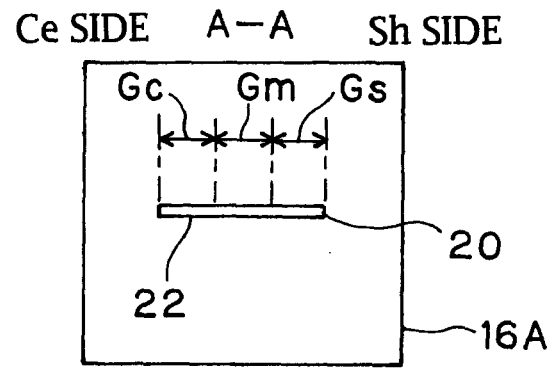
FIGS. 3A to 3C are each a plan view of a block according to First Embodiment in each of wear stages.

So far as the sipe 20 having the foregoing configuration is concerned, in the opening side region Ho on the tread surface 28 side, the whole of the sipe length direction G is composed of the straight sipe portion 22. Therefore, as shown in FIG. 3A, at the time of a new article of tire and at the beginning of wear, the opening shape of the sipe 20 is formed in a straight line over the whole of the length direction G (this state will be referred to as a "first wear stage").

Figure 3B:
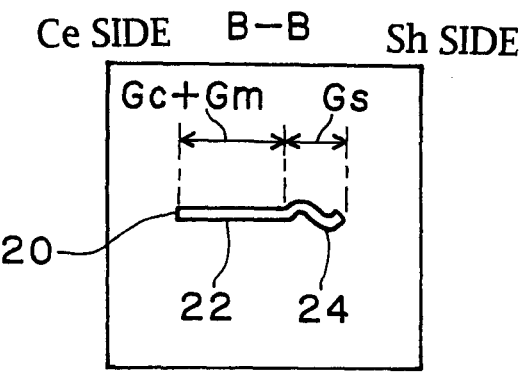

In the central depth region Hm, the outer region Gs is composed of the waveform sipe portion 24, and the central region Gm and the inner region Gc are composed of the straight sipe portion 22. Therefore, as shown in FIG. 3B, in the middle period of wear (for example, in a stage at which the tire wears to an extent of from 30 to 70%), in the sipe 20, the outer region Gs on the ground contact end side Sh is formed in a waveform shape, and other regions Gm and Gc are formed in a straight opening shape (this state will be referred to as a "second wear stage").

Figure 3C:
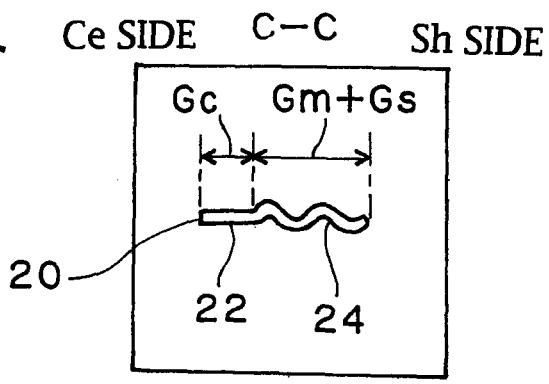

Then, in the bottom part region Hb, the outer region Gs and the central region Gm are composed of the waveform sipe portion 24, and the inner region Gc is composed of the straight sipe portion 22. Therefore, as shown in FIG. 3C, at the end of wear (for example, in a stage at which the tire wears to an extent of 70% or more), in the sipe 20, the outer region Gs and the central region Gm are formed in a waveform shape, and the inner region Gc is formed in a straight opening shape (this state will be referred to as a "third wear stage").

Since such a sipe configuration is taken, in the region on the ground contact end side Sh where a load is large at the time of normal running, the local movement of the block 16A can be suppressed while suppressing collapse of the sipe 20. This action is described below in more detail. In general, in tires running on a road surface with a high coefficient of friction such as all-season tires and summer tires, there is a tendency that on the ground contact end side Sh within the shoulder region 18, the ground contact pressure is locally raised at the time of braking, so that collapse of the sipe becomes large. On the other hand, in the present embodiment, in the region on the ground contact end side Sh, the sipe bottom part side is formed of the waveform sipe portion 24. As compared with the straight sipe portion 22, the waveform sipe portion 24 is large in a contact area between the wall faces of the sipe 20, and therefore, the friction becomes large in proportion thereto, and the sipe 20 hardly collapses. For that reason, in the region on the ground contact end side Sh where collapse of the sipe 20 is large, the local movement of the shoulder block 16A can be suppressed while allowing the sipe 20 to collapse hardly. According to this, the ground contact properties of the shoulder block 16A become uniform, so that a braking performance and a wear performance can be enhanced.

Also, in the present embodiment, the sipe 20 is set up in such a manner that the depth dimension of the waveform sipe portion 24 becomes larger toward the region on the ground contact end side Sh. Therefore, the friction of the waveform sipe portion 24 can be made larger toward the ground contact end side Sh where the tendency of collapse of the sipe is larger, thereby enabling the sipe to collapse more hardly. For that reason, the ground contact properties of the shoulder block 16A can be made more uniform, and an effect for enhancing a braking performance and a wear performance can be raised.

Also, in the present embodiment, at the time of a new article, the opening shape of the sipe 20 is in straight line, and therefore, there is also brought such a merit that when seen as an all-season tire or a summer tire, an uncomfortable feeling by eyes can be eliminated.

According to the sipe configuration of the present embodiment, in the inner region Gc on the equator side Ce, a sipe shape of its bottom part region Hb is formed in a straight line. For that reason, on the occasion in which after vulcanization molding of the tire, a sipe molding blade is removed from the tread part 10, this straight sipe portion 22 acts as an initial (or a trigger), and the waveform sipe portion 24 on the ground contact end side Sh is also easily removable. Accordingly, in the sipe 20 having the waveform sipe portion 24 on the sipe bottom part side, nevertheless the sipe is a closed sipe, the generation of defectiveness such as chipping of rubber at the time of die release can be suppressed.

Furthermore, since a structure in which the sipe 20 is divided into three regions in the length direction G, thereby allowing the waveform sipe portion 24 to appear stepwise is taken, the sipe 20 can also be allowed to play a role as an indicator to inform of a wear amount of the tread part 10.

Second Embodiment

FIGS. 5A to 5C are each a view of showing the sipe 20 according to Second Embodiment in each of wear stages. In this exemplary embodiment, the wave number of the waveform sipe portion 24 is increased twice as compared with the foregoing First Embodiment. In this way, the wave number of the waveform sipe portion 24 is not particularly limited, and various modifications can be made. Also, the amplitude and wavelength of the waveform and the like are not particularly limited, and they can be properly set up. With respect to Second Embodiment, other configurations are the same as those in First Embodiment, and the same functions and effects are brought.

Third Embodiment

Figure 6:
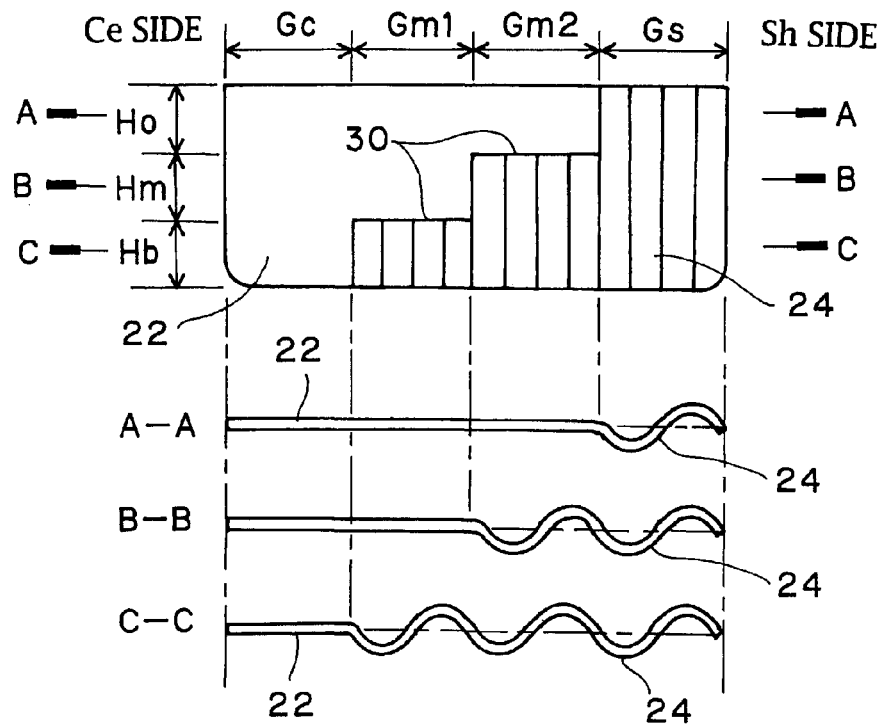
FIG. 6 is a front view showing a wall face of a sipe according to Third Embodiment and is a sectional view thereof in each of wear stages.

FIG. 6 is a view showing the sipe 20 according to Third Embodiment and is concerned with a front view showing a sipe wall face and a section in each of wear stages (A-A line section in a first wear stage, B-B line section in a second wear stage, and C-C line section in a third wear stage). In this exemplary embodiment, in an end part on the tread ground contact end side Sh in the sipe length direction G, a region in which the waveform sipe portion 24 is provided over the whole of the sipe depth direction H. On that point, Third Embodiment is different from First Embodiment.

That is, in this exemplary embodiment, the sipe 20 is divided into four regions in its length direction G, in which a region on the equator side Ce is defined as the inner region Gc, a region adjacent to its ground contact end side Sh is defined as a first central region Gm1, a region adjacent to the ground contact end side Sh of the first central region Gm1 is defined as a second central region Gm2, and a region on the most ground contact end side Sh is defined as the outer region Gs. Incidentally, similar to First Embodiment, the depth direction H is divided into three regions. Also, though a width of each of the regions Gc, Gm1, Gm2 and Gs is not particularly limited, it is preferably from 15 to 40% relative to the full length L of the sipe 20 (namely, the inner region Gc=from 0.15 L to 0.4 L, the first central region Gm1=from 0.15 L to 0.4 L, the second central region Gm2=from 0.15 L to 0.4 L, and the outer region Gs=from 0.15 L to 0.4 L). It is more preferable that the full length L of the sipe 20 is divided into four equal parts.

Then, when the respective regions of the length direction G and the depth direction H are defined in this way, in the sipe 20, the inner region Gc is formed in the straight sipe portion 22 over the whole of the depth direction H; and with respect to the first central region Gm1, the opening side region Ho and the central depth region Hm are formed in the straight sipe portion 22, and the bottom part region Hb is formed in waveform sipe portion 24. Also, with respect to the second central region Gm2, the opening side region Ho is formed in the straight sipe portion 22, and the central depth region Hm and the bottom part region Hb are formed in the waveform sipe portion 24. Furthermore, the outer region Gs is formed in the waveform sipe portion 24 over the whole of the depth direction H.

In this way, the invention is not limited to the case where the sipe shape at the time of a new article is formed in a straight line over the whole of the length direction G, but by forming the waveform sipe portion 24 in the region Gs positioning in the end part on the ground contact end side Sh over the whole of the depth direction H, the effect for suppressing collapse of the sipe 20 in the subject end part can be more raised. Other configurations and functions and effects are the same as those in First Embodiment.

Fourth Embodiment

Figure 7:
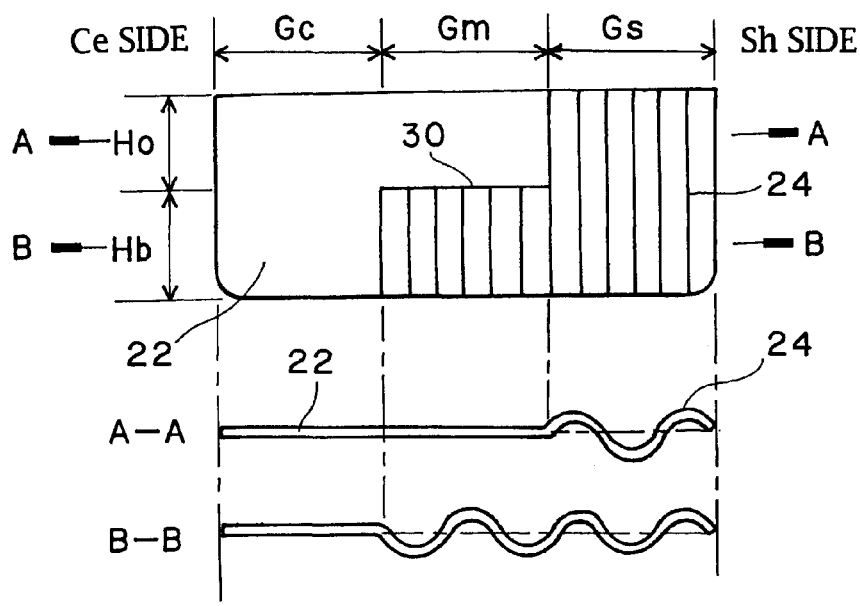
FIG. 7 is a front view showing a wall face of a sipe according to Fourth Embodiment and is a sectional view thereof in each of wear stages.

FIG. 7 is a view showing the sipe 20 according to Fourth Embodiment and is concerned with a front view showing a sipe wall face and a section in each of wear stages (A-A line section at the beginning of wear and B-B line section at the end of wear). In this exemplary embodiment, the division number in the length direction G and the depth direction H of the sipe 20 is different from that of the foregoing Third Embodiment.

That is, in this exemplary embodiment, similar to First Embodiment, the sipe 20 is divided into three regions of the inner region Gc, the central region Gm and the outer region Gs in the length direction G. Meanwhile, the depth direction H is divided into two regions of the opening side region Ho on the sipe opening 26 side and the bottom part region Hb on the sipe bottom part side. Incidentally, though a depth of each of the regions Ho and Hb is not particularly limited, it is preferably from 30 to 70% relative to the depth D of the sipe 20 (namely, the opening side region Ho=from 0.3 D to 0.7 D, and the bottom part region Hb=from 0.3 D to 0.7 D). It is more preferable that the depth D of the sipe 20 is divided into two equal parts.

Then, under such a definition, in the sipe 20, the inner region Gc is formed in the straight sipe portion 22 over the whole of the depth direction H; and with respect to the central region Gm, the opening side region Ho is formed in the straight sipe portion 22, and the bottom part region Hb is formed in the waveform sipe portion 24; and the outer region Gs is formed in the waveform sipe portion 24 over the whole of the depth direction H.

In this way, the sipe 20 may be formed so as to be divided into two regions in the sipe depth direction H. However, in that case, since the change in shape of the sipe 20 by the wear stage is in a two-stage manner, discrimination of the wear amount as an indicator is also in a two-stage manner. Also, as compared with Third Embodiment, since the stepwise configuration of the waveform sipe portion 24 is in a two-stage manner, it is difficult to obtain a minute effect for suppressing collapse corresponding to the ground contact pressure in the tire width direction B. For that reason, the division number in each of the sipe depth direction H and the length direction G is preferably three or more. Other configurations and functions and effects are the same as those in Third Embodiment.

Fifth Embodiment

Figure 8:
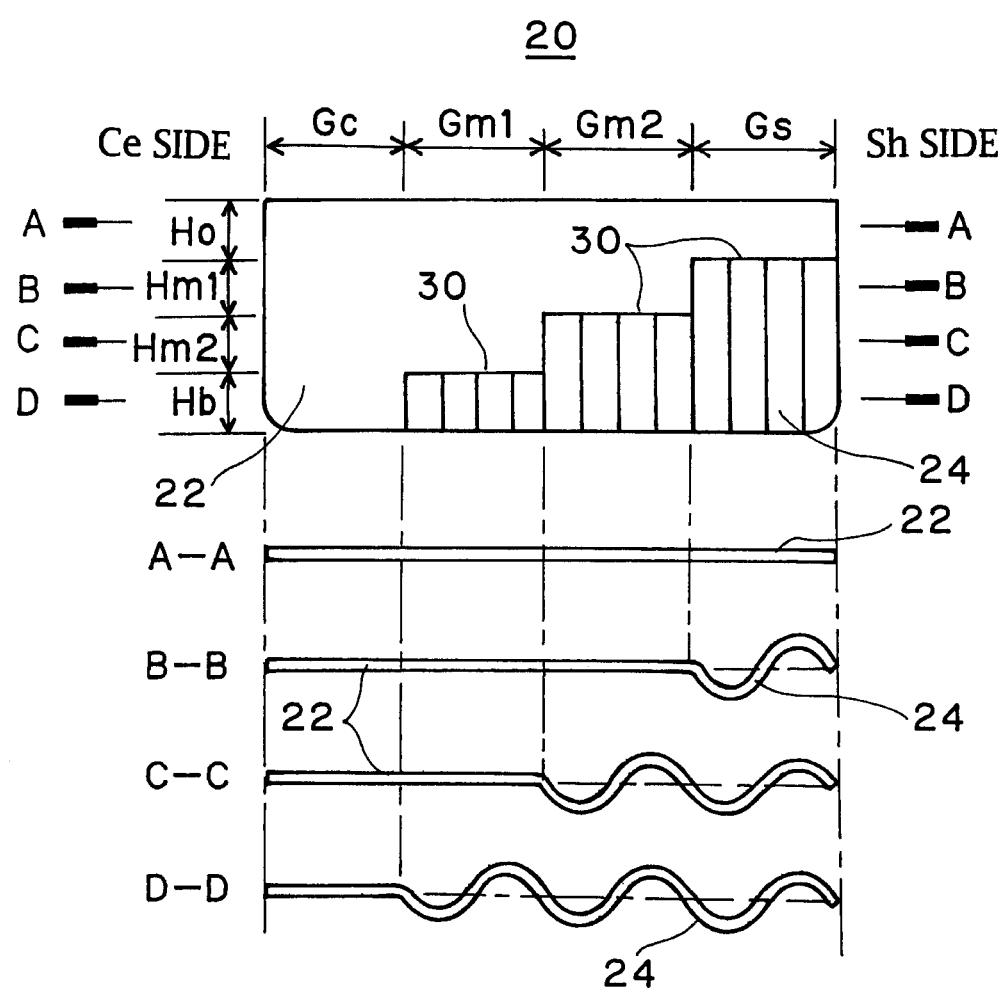
FIG. 8 is a front view showing a wall face of a sipe according to Fifth Embodiment and is a sectional view thereof in each of wear stages.

FIG. 8 is a view showing the sipe 20 according to Fifth Embodiment and is concerned with a front view showing a sipe wall face and a view of each of sections of four stages of from the beginning of wear to the end of wear (A-A line section, B-B line section, C-C line section and D-D line section). This exemplary embodiment is different from the foregoing First Embodiment on the point that the sipe 20 is divided into four regions in each of the length direction G and the depth direction H.

That is, in this exemplary embodiment, similar to Third Embodiment, the sipe 20 is divided into four regions of the inner region Gc, the first central region Gm1, the second central region Gm2 and the outer region Gs. Also, with respect to the depth direction H, the sipe 20 is divided into four regions, in which a region on the sipe opening 26 side is defined as the opening side region Ho, a region adjacent to its bottom part side is defined as the first central depth region Hm1, a region adjacent to the bottom part side of the first central depth region Hm1 is defined as the second central depth region Hm2, and a region of the most sipe bottom part side is defined as the bottom part region Hb. Incidentally, though a depth of each of the regions Ho, Hm1, Hm2 and Hb is not particularly limited, it is preferably from 15 to 40% relative to the depth D of the sipe 20 (namely, the opening side region Ho=from 0.15 D to 0.4 D, the first central depth region Hm1=from 0.15 D to 0.4 D, the second central depth region Hm2=from 0.15 D to 0.4 D, and the bottom part region Hb=from 0.15 D to 0.4 D). It is more preferable that the depth D of the sipe 20 is divided into four equal parts.

Incidentally, the depth D of the sipe 20 is preferably from 50 to 90% of the depth of the longitudinal groove 12.

Then, under such a definition, in the sipe 20, the inner region Gc is formed in the straight sipe portion 22 over the whole of the depth direction H; and with respect to the first central region Gm1, from the opening side region Ho to the second central depth region Hm2 are formed in the straight sipe portion 22, and the bottom part region Hb is formed in the waveform sipe portion 24. Also, with respect to the second central region Gm2, the opening side region Ho and the first central depth region Hm1 are formed in the straight sipe portion 22, and the second central depth region Hm2 and the bottom part region Hb are formed in the waveform sipe portion 24. Then, with respect to the outer region Gs, the opening side region Ho is formed in the straight sipe portion 22, and from the first central depth region Hm1 to the bottom part region Hb are formed in the waveform sipe portion 24.

In this way, the division number in each of the length direction G and the depth direction H of the sipe 20 can also be made four or more. Though an upper limit of the division number is not particularly limited, in view of a relation with the full length L or the depth D of the sipe 20, the division number in the sipe length direction G is preferably not more than five, and the division number in the depth direction H is preferably not more than four. Other configurations and functions and effects are the same as those in First Embodiment.

Sixth Embodiment

Figure 9:
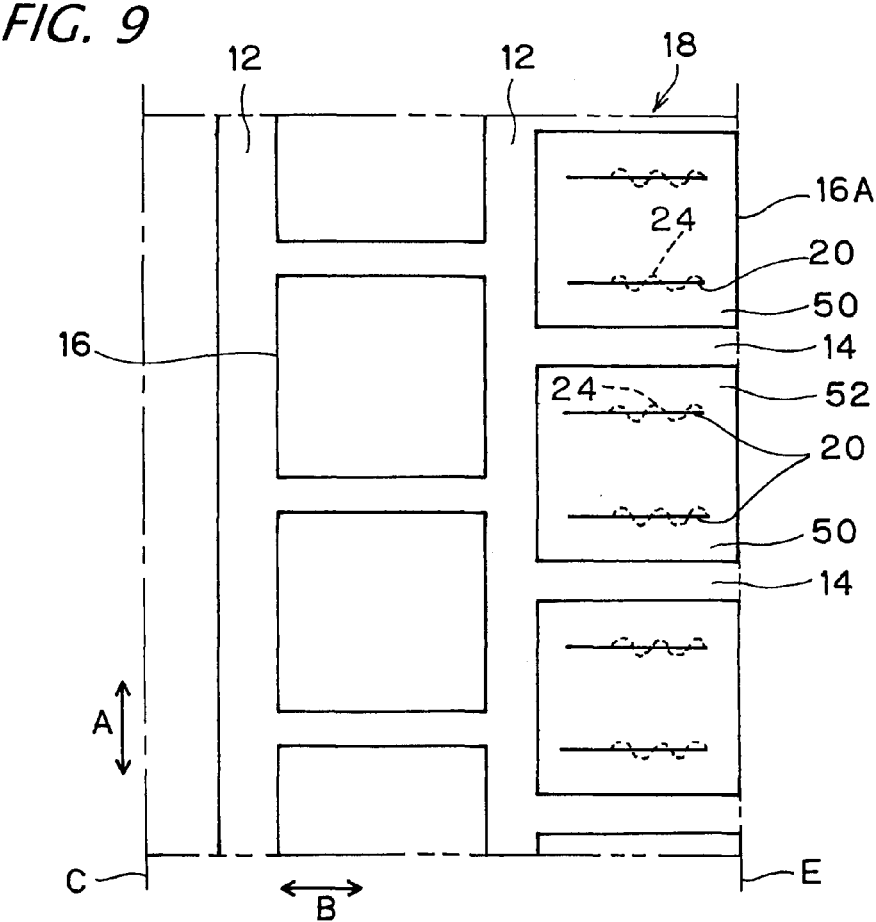
FIG. 9 is a development showing a tread pattern of a tire according to Sixth Embodiment.

FIG. 9 is a view showing a tread pattern of a tire according to Sixth Embodiment. This exemplary embodiment is characterized in that the sipe 20 is provided in each of a tread-in side part 50 and a kick-out side part 52 in the plural blocks 16A provided in the shoulder region 18.

That is, in this exemplary embodiment, the sipe 20 is provided in each of the tread-in side part 50 on one end side and the kick-out side part 52 on the other end side of the tire circumferential direction A in the respective shoulder block 16. With respect to Six Embodiment, other configurations are the same as those in First Embodiment, and the same functions and effects are brought.

Then, in particular, in Six Embodiment, the pair of sipes 20 can be utilized as an indicator of toe-and-heel wear. Incidentally, in that case, as in the exemplary embodiment shown in FIG. 9, the sipe 20 may be provided in each of the tread-in side part 50 and the kick-out side part 52 of the respective block 16A. Alternatively, for example, by providing every one sipe 20 in the respective block 16A, these sipes 20 may be provided in the tread-in side part 50 and the kick-out side part 52 across the transverse groove 14 between the adjacent blocks.

Other Embodiments

In the foregoing embodiments, the sipes 20 are provided in parallel in the tire width direction B. However, so far as the sipes 20 extend toward the tire width direction B, the sipes 20 may be a sipe extending inclined against the width direction B.

Also, in the foregoing embodiments, the sipe 20 is provided in all of the shoulder blocks 16A. However, it is not always necessary to provide the sipe 20 in all of the shoulder blocks 16A. Also, in the foregoing embodiments, the exemplary embodiments in which a block row is formed in the shoulder region 22 have been described. However, it should not be construed that the invention is limited to the case of such a block row, and the tire may be configured by providing the same sipes 20 in a rib that is a continuous land part in the tire circumferential direction A (namely, a shoulder rib). While others are not enumerated one by one, various modifications can be made so far as the gist of the invention is not deviated.

EXAMPLES

Figure 10:
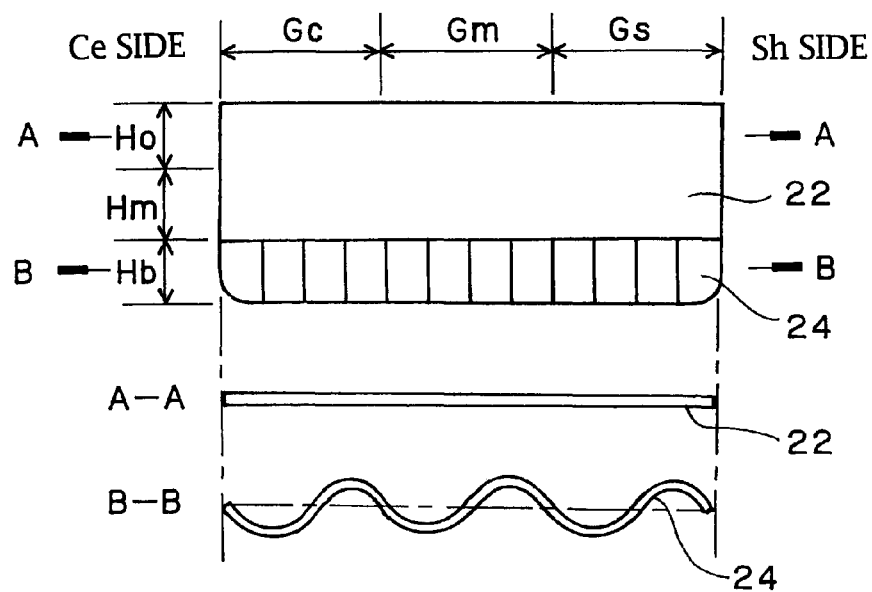
FIG. 10 is a front view showing a wall face of a sipe according to COMPARATIVE EXAMPLE and is a sectional view thereof in each of wear stages.

Each of a pneumatic radial tire having the tread pattern of First Embodiment as shown in FIGS. 1 to 4 as EXAMPLE and a pneumatic radial tire having a tread pattern provided with a sipe 100 shown in FIG. 10 as COMPARATIVE EXAMPLE was made on an experimental basis and evaluated with respect to the presence or absence of chipping of rubber at the time of manufacture, a wear performance and a dry braking performance.

Each dimension of the sipe 20 in the tire of EXAMPLE is as follows. Sipe full length L=12 mm, and sipe depth D=6 mm. A width of each of the regions in the sipe length direction G is 4 mm for the inner region Gc, 4 mm for the central region Gm and 4 mm for the outer region Gs. A depth of each of the regions in the sipe depth direction H is 2 mm for the opening side region Ho, 2 mm for the central depth region Hm and 2 mm for the bottom part region Hb.

The tire of COMPARATIVE EXAMPLE is different only in the sipe shape from that of EXAMPLE. In comparison with the sipe 20 of EXAMPLE, the sipe 100 of COMPARATIVE EXAMPLE is one in which the waveform sipe portion 24 is formed only in the bottom part region Hb over the whole of the sipe length direction G.

Four wheels of tires having a tire size of 195/65R15 and a rim size of 15×6 were installed in a 2,000-cc class automobile (FF-sedan) (air pressure: 210 kPa), and the performance evaluation was carried out. The evaluation methods are as follows.

Chipping of Rubber:

The tire which was made on an experimental basis after vulcanization was observed through visual inspection, and the presence or absence of chipping of rubber in the vicinity of the sipe 20 or the sipe 100 was confirmed.

Dry Braking Performance:

The dry braking performance was evaluated by measuring a braking distance when ABS was actuated by applying a braking force from the time of a speed of 100 km/h on a dry asphalted road, thereby reducing the speed to a speed of 20 km/h. The evaluation was made with respect to a new article of tire. The results are shown as an index with respect to a reciprocal of a braking distance while defining a value of COMPARATIVE EXAMPLE as 100. It is meant that the larger the numerical value, the shorter the braking distance and the more excellent the dry braking performance.

Wear Performance:

A toe-and-heel wear amount of the tire shoulder block 16A at the time of running of 8,000 km on an asphalted road was measured, and a reciprocal of the wear amount was expressed as an index while defining a value of COMPARATIVE EXAMPLE as 100. It is meant that the larger the numerical value, the smaller the toe-and-heel wear amount and the more excellent the wear performance. The "toe-and-heel wear amount" as referred to herein is a difference between a tread-in side wear amount and a kick-out side wear amount between the adjacent blocks.

The results are shown in the following Table 1. In the sipe shape of COMPARATIVE EXAMPLE that is a conventional example, chipping of rubber was generated at the time of manufacture. On the other hand, in the tire according to EXAMPLE, defectiveness of chipping of rubber was not observed at the time of manufacture. Also, as compared with the tire of COMPARATIVE EXAMPLE, in the tire of EXAMPLE, the dry braking performance was enhanced, and the toe-and-heel wear amount was suppressed.

TABLE 1

|  | COMPARATIVE EXAMPLE | EXAMPLE |
| --- | --- | --- |
| Chipping of rubber | Yes | No |
| Dry braking performance | 100 | 105 |
| Wear performance | 100 | 105 |

As stated above, according to the pneumatic tire of the embodiments, a sipe shape of its bottom part is formed in a straight line in an end part on the tire equator side. For that reason, on the occasion in which after vulcanization molding of the tire, a sipe molding blade is removed from the tread part, this straight portion acts as an initial (or a trigger), and the waveform sipe portion on the tread ground contact end side is also easily removed. Also, in the region on the tread ground contact end side where a load is large at the time of normal running, the sipe bottom part side is formed of a waveform sipe, and therefore, the movement of a block can be suppressed while suppressing collapse of the sipe in the subject region. Also, the sipe can be allowed to play a role as, for example, a wear indicator by utilizing the fact that a sectional shape of the sipe changes with the progress of wear.

What is claimed is:

1. A pneumatic tire comprising a sipe extending in a tire width direction provided in a land part located in a shoulder region of a tread part, both ends of which terminate within the land part, comprising:
   the sipe being formed in such a manner;
      that an inner region on the tire equator side in a sipe length direction is formed in a straight sipe portion over the whole of a sipe depth direction, wherein the straight sipe portion has a sipe shape extending in a straight line for a predetermined length along the sipe length direction, and
      that a region on the tread ground contact end side relative to the inner region is divided into a straight sipe portion on the sipe opening side and a curved waveform sipe portion on the sipe bottom part side in a sipe depth direction, wherein the straight sipe portion is located on or above the waveform sipe portion in the sipe depth direction, and further wherein the sipe is straight along the entire opening and extends straight, downward in the depth direction for a predetermined distance.

2. The pneumatic tire according to claim 1, wherein the region divided into the straight sipe portion and the waveform sipe portion in the sipe depth direction is divided into plural regions in the sipe length direction, and the plural regions are set up in such a manner that a dimension in the sipe depth direction of the waveform sipe portion becomes larger toward the region on the tread ground contact end side.

3. The pneumatic tire according to claim 1, wherein the sipe is provided in each of a tread-in side part and a kick-out part side in a block provided in the shoulder region.

4. A pneumatic tire comprising a sipe extending in a tire width direction provided in a land part located in a shoulder region of a tread part, both ends of which terminate within the land part, wherein the sipe is formed in such a manner that an inner region on the tire equator side in a sipe length direction is formed in a straight sipe portion over the whole of a sipe depth direction and that a region on the tread ground contact end side relative to the inner region is divided into a straight sipe portion on the sipe opening side and a waveform sipe portion on the sipe bottom part side in a sipe depth direction, wherein the region divided into the straight sipe portion and the waveform sipe portion in the sipe depth direction is divided into plural regions in the sipe length direction, and the plural regions are set up in such a manner that a dimension of the waveform sipe portion in the sipe depth direction becomes larger toward the region on the tread ground contact end side, wherein when the sipe is divided into the inner region on the tire equator side, an outer region on the tread ground contact end side and a central region between the inner region and the outer region in the sipe length direction and is also divided into an opening side region on the sipe opening side, a bottom part region on the sipe bottom part side and a central depth region between the opening side region and the bottom part region in the sipe depth direction, the inner region is formed in the straight sipe portion over the whole of the sipe depth direction; with respect to the central region, the opening side region and the central depth region are formed in the straight sipe portion, and the bottom part region is formed in the waveform sipe portion; and with respect to the outer region, the opening side region is formed in the straight sipe portion, and the central depth region and the bottom part region are formed in the waveform sipe portion.

5. A pneumatic tire comprising a sipe extending in a tire width direction provided in a land part located in a shoulder region of a tread part, both ends of which terminate within the land part, wherein the sipe is formed in such a manner;

that an inner region on the tire equator side in a sipe length direction is formed in a straight sipe portion over the whole of a sipe depth direction, wherein the straight sipe portion has a sipe shape extending in a straight line for a predetermined distance along the sipe length direction, and that a region on the tread ground contact end side relative to the inner region is divided into a straight sipe portion on the sipe opening side and a waveform sipe portion on the sipe bottom part side in a sip depth direction, wherein the straight sipe portion is located on or above the waveform sipe portion in the sipe depth direction, and wherein a region formed in the waveform sipe portion over the whole of the sipe depth direction is provided in the end part on the tread ground contact end side in the sipe length direction.

6. The pneumatic tire according to claim 5, wherein the region divided into the straight sipe portion and the waveform sipe portion in the sipe depth direction is divided into plural regions in the sipe length direction, and the plural regions are set up in such a manner that a dimension in the sipe depth direction of the waveform sipe portion becomes larger toward the region on the tread ground contact end side.

* * * * *